US010582488B2

(12) United States Patent
Morioka

(10) Patent No.: US 10,582,488 B2
(45) Date of Patent: *Mar. 3, 2020

(54) METHOD AND TERMINAL DEVICE FOR ALLOCATING RESOURCES IN A PLURALITY OF SUBFRAMES

(71) Applicants: Sony Corporation, Tokyo (JP); Sony Europe Limited, Surrey (GB)

(72) Inventor: Yuichi Morioka, Berkshire (GB)

(73) Assignees: SONY CORPORATION, Tokyo (JP); SONY EUROPE LIMITED, Surrey (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/170,348

(22) Filed: Oct. 25, 2018

(65) Prior Publication Data
US 2019/0069280 A1    Feb. 28, 2019

Related U.S. Application Data

(63) Continuation of application No. 15/661,509, filed on Jul. 27, 2017, now Pat. No. 10,129,865, which is a
(Continued)

(30) Foreign Application Priority Data
May 21, 2012    (GB) .................................. 1208906.6

(51) Int. Cl.
*H04W 72/04*    (2009.01)
*H04L 5/00*    (2006.01)
*H04W 72/12*    (2009.01)

(52) U.S. Cl.
CPC ........... *H04W 72/042* (2013.01); *H04L 5/003* (2013.01); *H04L 5/0091* (2013.01); *H04W 72/1289* (2013.01)

(58) Field of Classification Search
CPC ..... H04L 5/003; H04L 5/0091; H04L 5/0053; H04L 5/00; H04L 5/0064; H04L 5/0001;
(Continued)

(56) References Cited

U.S. PATENT DOCUMENTS 8,902,802 B2    12/2014  Park et al.
9,295,088 B2 *   3/2016  Lee .................... H04W 76/10
(Continued)

FOREIGN PATENT DOCUMENTS

CN    101425880 A    5/2009
CN    102106096 A    6/2011
(Continued)

OTHER PUBLICATIONS

Great Britain Search Report dated Sep. 18, 2012 in GB1208906.6 Filed May 21, 2012.
(Continued)

*Primary Examiner* — Dung B Huynh
(74) *Attorney, Agent, or Firm* — Xsensus LLP

(57) ABSTRACT

A method operating a telecommunications system including a base station and plural terminal devices arranged to communicate over a radio interface supporting a downlink shared channel conveying user-plane data from the base station to the terminal devices and a downlink control channel conveying control-plane data from the base station to the terminal devices. The control-plane data conveys information on physical resource allocations for the downlink shared channel for respective of the terminal devices. The radio interface is based on a radio frame structure including plural subframes each including a control region supporting the downlink control channel and a user-plane region supporting the downlink shared channel. The method uses the control region of a first radio subframe to convey an indication of a physical resource allocation for a first ter-
(Continued)

minal device on the shared downlink channel in the user-plane region of a second radio subframe subsequent to the first radio subframe.

18 Claims, 8 Drawing Sheets

Related U.S. Application Data continuation of application No. 14/394,381, filed as application No. PCT/GB2013/051277 on May 17, 2013, now Pat. No. 9,723,604.

(58) Field of Classification Search
CPC . H04W 72/042; H04W 72/1289; H04W 4/70; H04W 68/005; H04W 48/12; H04W 68/02; H04W 52/0216
See application file for complete search history.

(56) References Cited

U.S. PATENT DOCUMENTS

| | | | |
|---|---|---|---|
| 2007/0263814 A1 | 11/2007 | Jain et al. | |
| 2010/0057485 A1* | 3/2010 | Luft | H04W 4/70 455/411 |
| 2010/0098179 A1 | 4/2010 | Bala et al. | |
| 2010/0202384 A1* | 8/2010 | Baker | H04W 52/0229 370/329 |
| 2010/0246518 A1* | 9/2010 | Gheorghiu | H04L 1/0028 370/329 |
| 2010/0309867 A1* | 12/2010 | Palanki | H04L 5/0053 370/329 |
| 2011/0002309 A1 | 1/2011 | Park et al. | |
| 2011/0007673 A1 | 1/2011 | Ahn et al. | |
| 2011/0064037 A1 | 3/2011 | Wei et al. | |
| 2011/0105050 A1 | 5/2011 | Khandekar et al. | |
| 2011/0122825 A1* | 5/2011 | Lee | H04J 11/0069 370/328 |
| 2011/0199905 A1 | 8/2011 | Pinheiro et al. | |
| 2011/0222486 A1* | 9/2011 | Hart | H04W 24/04 370/329 |
| 2011/0235558 A1 | 9/2011 | Diachina et al. | |
| 2011/0235584 A1* | 9/2011 | Chen | H04L 1/008 370/328 |
| 2011/0244907 A1* | 10/2011 | Golaup | H04W 4/70 455/509 |
| 2011/0271168 A1 | 11/2011 | Han et al. | |
| 2011/0274060 A1 | 11/2011 | Luo et al. | |
| 2011/0274064 A1 | 11/2011 | Luo et al. | |
| 2011/0286406 A1 | 11/2011 | Chen et al. | |
| 2011/0292893 A1 | 12/2011 | Lee et al. | |
| 2011/0310830 A1 | 12/2011 | Wu et al. | |
| 2011/0317670 A1 | 12/2011 | Zhang et al. | |
| 2012/0033613 A1 | 2/2012 | Lin et al. | |
| 2012/0040643 A1 | 2/2012 | Diachina et al. | |
| 2012/0051297 A1 | 3/2012 | Lee et al. | |
| 2012/0058764 A1 | 3/2012 | Kang et al. | |
| 2012/0076085 A1* | 3/2012 | Chou | H04W 68/00 370/329 |
| 2012/0087266 A1 | 4/2012 | Vajapeyam et al. | |
| 2012/0093095 A1 | 4/2012 | Barbieri et al. | |
| 2012/0093107 A1 | 4/2012 | Jeong et al. | |
| 2012/0113920 A1 | 5/2012 | Cheng et al. | |
| 2012/0115485 A1 | 5/2012 | Narasimha et al. | |
| 2012/0117140 A1 | 5/2012 | Wang et al. | |
| 2012/0142371 A1 | 6/2012 | Park et al. | |
| 2012/0155404 A1* | 6/2012 | Shin | H04W 60/04 370/329 |
| 2012/0250501 A1 | 10/2012 | Lee | |
| 2012/0257552 A1 | 10/2012 | Chen et al. | |
| 2012/0257554 A1 | 10/2012 | Kim et al. | |
| 2012/0264468 A1 | 10/2012 | Turtinen et al. | |
| 2012/0269151 A1 | 10/2012 | Lee, II et al. | |
| 2012/0275322 A1 | 11/2012 | Ji et al. | |
| 2012/0287854 A1 | 11/2012 | Xie et al. | |
| 2012/0300685 A1* | 11/2012 | Kim | H04W 68/02 370/311 |
| 2012/0327895 A1* | 12/2012 | Wallen | H04W 48/12 370/330 |
| 2013/0003629 A1* | 1/2013 | Jeong | H04W 52/0216 370/311 |
| 2013/0003664 A1 | 1/2013 | Frenne et al. | |
| 2013/0016692 A1 | 1/2013 | Chen et al. | |
| 2013/0028205 A1 | 1/2013 | Damnjanovic et al. | |
| 2013/0029716 A1 | 1/2013 | Lee et al. | |
| 2013/0044699 A1 | 2/2013 | Eriksson | |
| 2013/0044702 A1* | 2/2013 | Jayaraman | H04W 48/06 370/329 |
| 2013/0077534 A1* | 3/2013 | Hu | H04L 41/5054 370/259 |
| 2013/0083753 A1* | 4/2013 | Lee | H04W 72/0453 370/329 |
| 2013/0083765 A1* | 4/2013 | Ai | H04W 4/70 370/329 |
| 2013/0084845 A1* | 4/2013 | Kimura | H04W 52/0216 455/418 |
| 2013/0114572 A1 | 5/2013 | Fong et al. | |
| 2013/0136048 A1* | 5/2013 | Cho | H04B 7/00 370/311 |
| 2013/0163543 A1 | 6/2013 | Freda et al. | |
| 2013/0170347 A1 | 7/2013 | Zhang et al. | |
| 2013/0194980 A1 | 8/2013 | Yin et al. | |
| 2013/0201936 A1* | 8/2013 | Chen | H04W 72/04 370/329 |
| 2013/0203450 A1* | 8/2013 | Mochizuki | H04W 68/02 455/458 |
| 2013/0235820 A1 | 9/2013 | Wu | |
| 2013/0242848 A1* | 9/2013 | Kim | H04L 12/189 370/312 |
| 2013/0242882 A1 | 9/2013 | Blankenship et al. | |
| 2013/0250772 A1* | 9/2013 | Yin | H04L 1/1822 370/241 |
| 2013/0272261 A1 | 10/2013 | Seo et al. | |
| 2013/0279462 A1 | 10/2013 | He et al. | |
| 2013/0281090 A1 | 10/2013 | Maeda et al. | |
| 2013/0294361 A1* | 11/2013 | Chen | H04L 5/0053 370/329 |
| 2013/0294363 A1 | 11/2013 | Feng et al. | |
| 2013/0301433 A1 | 11/2013 | Yin et al. | |
| 2013/0301501 A1* | 11/2013 | Olvera-Hernandez | H04W 52/0216 370/311 |
| 2013/0308465 A1* | 11/2013 | Xu | H04W 76/28 370/241 |
| 2013/0315186 A1 | 11/2013 | Kim et al. | |
| 2013/0322378 A1 | 12/2013 | Guan et al. | |
| 2013/0324141 A1 | 12/2013 | Jung et al. | |
| 2013/0336198 A1 | 12/2013 | Kim et al. | |
| 2013/0336301 A1* | 12/2013 | Deng | H04W 72/1289 370/336 |
| 2014/0016492 A1* | 1/2014 | Jung | H04W 24/10 370/252 |
| 2014/0016598 A1 | 1/2014 | Kwon et al. | |
| 2014/0029559 A1 | 1/2014 | Seo et al. | |
| 2014/0029565 A1* | 1/2014 | Kim | H04L 5/001 370/329 |
| 2014/0029594 A1* | 1/2014 | Lee | H04W 72/0446 370/336 |
| 2014/0071929 A1 | 3/2014 | Seo et al. | |
| 2014/0105191 A1* | 4/2014 | Yang | H04L 1/1867 370/336 |
| 2014/0126508 A1 | 5/2014 | Young et al. | |
| 2014/0133425 A1 | 5/2014 | Kim et al. | |
| 2014/0153452 A1* | 6/2014 | Son | H04L 5/001 370/280 |
| 2014/0161084 A1* | 6/2014 | Yang | H04L 1/1822 370/329 |
| 2014/0269594 A1* | 9/2014 | Jang | H04L 5/0048 370/329 |
| 2014/0301359 A1 | 10/2014 | Seo et al. | |
| 2014/0307692 A1 | 10/2014 | Hong | |

(56) References Cited

U.S. PATENT DOCUMENTS

| | | | |
|---|---|---|---|
| 2014/0314048 A1* | 10/2014 | Yi | H04W 36/0072 370/332 |
| 2014/0321382 A1 | 10/2014 | Guan | |
| 2014/0328230 A1* | 11/2014 | Park | H04W 4/70 370/281 |
| 2014/0334397 A1 | 11/2014 | Chen et al. | |
| 2014/0369281 A1 | 12/2014 | Zhu et al. | |
| 2015/0050955 A1 | 2/2015 | Kim et al. | |
| 2015/0146629 A1* | 5/2015 | Ranta-Aho | H04W 72/0453 370/329 |

FOREIGN PATENT DOCUMENTS

| | | |
|---|---|---|
| GB | 2487757 A | 8/2012 |
| GB | 2487780 A | 8/2012 |
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| GB | 2497742 A | 6/2013 |
| GB | 2497743 A | 6/2013 |
| GB | 2497939 A | 7/2013 |
| WO | 2010045428 A1 | 4/2010 |
| WO | 2010051209 A1 | 5/2010 |
| WO | 2010/141912 A2 | 12/2010 |
| WO | 2010141912 A2 | 12/2010 |
| WO | 2011032102 A1 | 3/2011 |
| WO | 2011120007 A1 | 9/2011 |
| WO | 2011130450 A1 | 10/2011 |
| WO | 2011136082 A1 | 11/2011 |
| WO | 2011140354 A1 | 11/2011 |
| WO | 2013116803 A1 | 8/2013 |

OTHER PUBLICATIONS

International Search Report dated Oct. 7. 2013 in PCT/GB13/051276 Filed May 17, 2013.

3rd Generation Partnership Project; Technical Specification Group Radio Access Network; Evolved Universal Terrestrial AAA Radio Access (E-UTRA) and Evolved Universal Terrestrial Radio Access Network (E-UTRAN); Overall description; Stage 2 (Release 11), 3GPP TS 36.300 V11.1.0, pp. 1-194, (Mar. 2012) XP 050580013.

Downlink control signaling enhancements, New Postcom, 3GPP TSG RAN WG1 Meeting #66bis R1-112986, pp. 1-3, (Oct. 10-14, 2011) XP 050S38056.

3rd Generation Partnership Project: Technical Specification Group Radio Access Network; Study on provision of low-cost AAC MTC UEs based on LTE; (Release 11), 3GPP a Global Initiative 3GPP TR 36.888 V1 .0.0, pp. 1-20, (Feb. 2012) XP 050555277.

3rd Generation Partnership Project: Technical Specification Group Radio Access Network; Evolved Universal Terrestrial AAD Radio Access (E-UTRA): Physical layer procedures (Release 10), 3GPP TS 36.213 V10.5.0, pp. 1-125, (Mar. 20, 2012) XP 050579996.

PDCCH Enhancement for Different TDD UL-DL Configuration on Different Bands, NTT Docomo, 3GPP TS RAN WG1 Meeting #68bis R1-121464, pp. 1-5, (Mar. 26-30, 2012) XP 50599745.

Digital cellular telecommunications system (Phase 2+); Universal Mobile Telecommunications System (UMTS); LTE; Service requirements for Machine-Type Communications (MTG); Stage 1 (3GPP TS 22.368 version 10.5.0 Release 10), LTE Advanced, ETSI TS 122 368 V10.5.0, pp. 1-18, (Jul. 2011).

On the reduction of baseband complexity for low cost MTC, Pantech, 3GPP TSG-RAN WG1 #66bis R1-113113, pp. 1-2, (Oct. 10-14, 2011).

Holma, H., et al., "LTE for UMTS OFDA and SC-FDMA Based Radio Access", John Wiley and Sons, pp. 25-27, (2009).

Notice of Rejection dated Oct. 4, 2016 in Japanese Patent Application No. 2015-513259.

eICIC of PCFICH and POCCH in MeNB Plus HeNBs Deployment, 6.8.1 Discussion and decision, MediaTek inc., 3GPP 11 TSG-RAN WG1 #61 bis., Jun. 28-Jul. 2, 2010, R1-103573, 4 pages.

Downlink control signaling enhancements in Rel-11, LG Electronics, 7.2.1.1, Discussion, 3GPP TSG RAN WG1 Meeting #66bis, Oct. 10-14, 2011, R1-113266, 2 pages.

Office Action dated Mar. 6, 2018 in European Patent Application No. 13 723 931.5, citing documents AO-AQ therein, 14 pages.

Japanese Office Action dated Nov. 7, 2017 in Patent Application No. 2017-137096 (with English Translation).

Itri, "Cross-carrier Scheduling and HARQ Timing for Different TDD UL-DL Configurations", 3GPP TSG-RAN WG1#68bis, R1-121653, 3GPP, Mar. 26-30, 2012, 8 pages.

Combined Office Action and Search Report dated Aug. 1, 2017 in Chinese Patent Application No. 201380026489.3 (with English language translation).

European Extended Search Report dated Dec. 6, 2018, issued in corresponding European Patent Application No. 18200155.2.

Indian Office Action dated Dec. 26, 2019, issued in corresponding Indian Patent Application No. 7770/DELNP/2014.

* cited by examiner

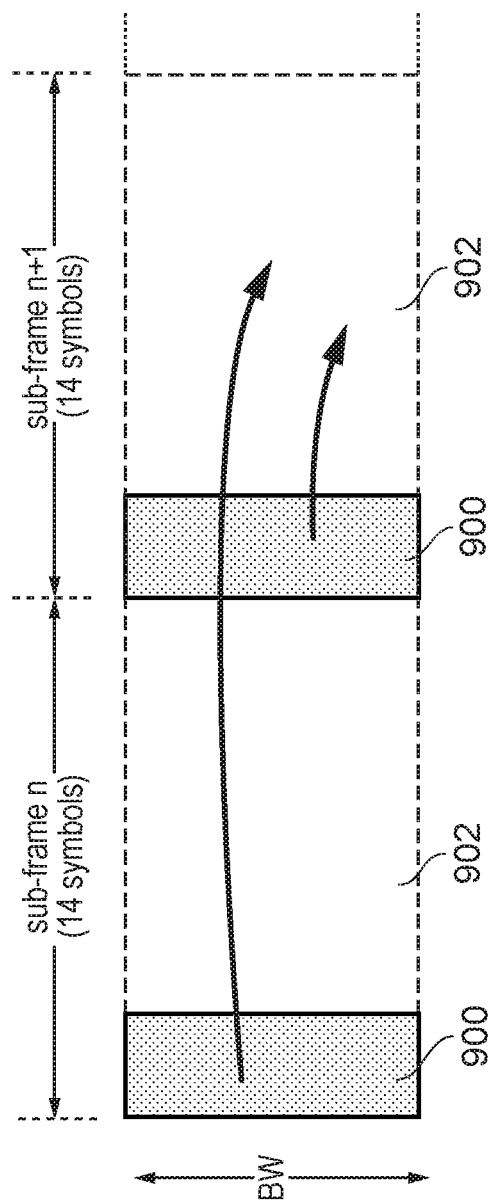

METHOD AND TERMINAL DEVICE FOR ALLOCATING RESOURCES IN A PLURALITY OF SUBFRAMES

CROSS-REFERENCE TO RELATED APPLICATIONS

The present application is a continuation of U.S. application Ser. No. 15/661,509, filed on Jul. 27, 2017, which is in continuation of U.S. application Ser. No. 14/394,381, filed on Oct. 14, 2014 (now U.S. Pat. No. 9,723,604), which is based on PCT/GB2013/051277 filed May 17, 2013, and claims priority to British Patent Application 1208906.6, filed in the UK IPO on May 21, 2012. The disclosures of the applications referenced above are incorporated herein by reference in their entireties.

BACKGROUND OF THE INVENTION

The present invention relates to wireless telecommunications systems and methods, and in particular to systems and methods for allocating transmission resources in wireless telecommunication systems.

Mobile communication systems have evolved over the past ten years or so from the GSM System (Global System for Mobile communications) to the 3G system and now include packet data communications as well as circuit switched communications. The third generation partnership project (3GPP) is developing a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Third and fourth generation mobile telecommunication systems, such as those based on the 3GPP defined UMTS and Long Term Evolution (LTE) architectures, are able to support a more sophisticated range of services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, some of which are in some respects typified by semi-autonomous or autonomous wireless communication devices (MTC devices) communicating small amounts of data on a relatively infrequent basis. Examples include so-called smart meters which, for example, are located in a customer's home and periodically transmit data back to a central MTC server relating to the customer's consumption of a utility such as gas, water, electricity and so on. Smart metering is merely one example of potential MTC device applications. Further information on characteristics of MTC-type devices can be found, for example, in the corresponding standards, such as ETSI TS 122 368 V10.530 (2011-07)/3GPP TS 22.368 version 10.5.0 Release 10) [1].

Whilst it can be convenient for a terminal such as an MTC-type terminal to take advantage of the wide coverage area provided by a third or fourth generation mobile telecommunication network there are at present disadvantages. Unlike a conventional third or fourth generation mobile terminal such as a smartphone, a primary driver for MTC-type terminals will be a desire for such terminals to be relatively simple and inexpensive. The type of functions typically performed by an MTC-type terminal (e.g. simple collection and reporting/reception of relatively small amounts of data) do not require particularly complex processing to perform, for example, compared to a smartphone supporting video streaming. However, third and fourth generation mobile telecommunication networks typically employ advanced data modulation techniques and support wide bandwidth usage on the radio interface which can require more complex and expensive radio transceivers and decoders to implement. It is usually justified to include such complex elements in a smartphone as a smartphone will typically require a powerful processor to perform typical smartphone type functions. However, as indicated above, there is now a desire to use relatively inexpensive and less complex devices which are nonetheless able to communicate using LTE-type networks.

With this in mind there has been proposed a concept of so-called "virtual carriers" operating within the bandwidth of a "host carrier", for example, as described in co-pending UK patent applications numbered GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]. A main principle underlying the concept of a virtual carrier is that a frequency subregion within a wider bandwidth host carrier is configured for use as a self-contained carrier, for example including all control signalling within the frequency subregion. An advantage of this approach is to provide a carrier for use by low-capability terminal devices capable of operating over only relatively narrow bandwidths. This allows devices to communicate on LTE-type networks, without requiring the devices to support full bandwidth operation. By reducing the bandwidth of the signal that needs to be decoded, the front end processing requirements (e.g., FFT, channel estimation, subframe buffering etc.) of a device configured to operate on a virtual carrier are reduced since the complexity of these functions is generally related to the bandwidth of the signal received.

There are, however, some potential drawbacks with some implementations of the "virtual carrier" approach. For example, in accordance with some proposed approaches the available spectrum is hard partitioned between the virtual carrier and the host carrier. This hard partitioning can be inefficient for a number of reasons. For example, the peak data rate that can be supported by high-rate legacy devices is reduced because high-rate devices can only be scheduled a portion of the bandwidth (and not the whole bandwidth). Also, when the bandwidth is partitioned in this way there can be a loss of trunking efficiency (there is a statistical multiplexing loss).

What is more, in some respects the virtual carrier approach represents a relatively significant departure from the current operating principles for LTE-type networks. This means relatively substantial changes to the current standards might be required to incorporate the virtual carrier concept into the LTE standards framework, thereby increasing the practical difficulty of rolling out these proposed implementations.

Another proposal for reducing the required complexity of devices configured to communicate over LTE-type networks is proposed in co-pending UK patent applications numbered GB 1121767.6 [11] and GB 1121766.8 [12]. These applications propose schemes for communicating data between a base station and a reduced-capability terminal device in an LTE-type wireless telecommunications system operating over a system frequency band. Physical-layer control information for the reduced-capability terminal device is transmitted from the base station using subcarriers selected from across the system frequency band as for conventional LTE terminal devices. However, higher-layer data for reduced-capability terminal devices (e.g. ATC user-plane data) is transmitted using only subcarriers selected from within a restricted frequency band which is smaller than and within the system frequency band. The terminal device is aware of the restricted frequency band, and as such need only buffer and process data within this restricted frequency band during periods where higher-layer data is being transmitted. The terminal device buffers and processes the full system frequency band during periods when physical-layer control information is being transmitted. Thus, the reduced-capability terminal device may be incorporated in a network in which physical-layer control information is transmitted over a wide frequency range, but only needs to have sufficient memory and processing capacity to process a smaller range of frequencies for the higher-layer data.

There are, however, some potential drawbacks with some implementations of the schemes proposed in GB 1121767.6 [11] and GB 1121766.8 [12]. For example, the scheduling flexibility available to the base station may be reduced because of the requirement to allocate resources to reduced-capability devices within a narrowed frequency band. Furthermore, where there is at least flexibility in selecting the reduced frequency band to be used, there can be a need for additional signalling between the base station and the reduced-capability terminal devices to negotiate (i.e. agree) the frequency range to be used. This is because the reduced-capability terminal device and the base station both need to know the narrowed bandwidth to be used such that the terminal device knows which part of the frame structure to buffer, and the base station knows to allocate resources for the reduced capability terminal device within this bandwidth.

Another proposal for reducing the required complexity of devices configured to communicate over LTE-type networks is proposed in the discussion document R1-113113 from Pantech submitted for the 3GPP TSG-RAN WG1 #66bis meeting in Zhuhai, China, 10 Oct. 2011 to 14 Oct. 2011 [12]. The proposal is for low-complexity terminal devices to be allocated a limited number of physical resource blocks as compared to a device with is fully LTE-compliant. This scheduling restriction means terminal devices can implement their turbo decoding function more simply, thereby reducing the processing complexity required.

However, while this can be helpful in reducing the processing capability required for turbo decoding, significant amounts of a device's processing requirements are associated with front-end digital signal processing functions prior to turbo decoding. Such front-end digital signal processing functions include, for example, FFT/IFFT (fast Fourier transform/inverse fast Fourier transform), channel estimation, equalization, digital filtering, etc.

Accordingly, there remains a desire for approaches which allow relatively inexpensive and low complexity devices to communicate using LTE-type networks.

SUMMARY OF THE INVENTION

According to an aspect of the invention there is provided a method of operating a base station in a telecommunications system comprising the base station and a plurality of terminal devices arranged to communicate with the base station over a radio interface supporting a downlink shared channel for conveying user-plane data from the base station to the terminal devices and a downlink control channel for conveying control-plane data from the base station to the terminal devices, wherein the control-plane data conveys information on physical resource allocations for the downlink shared channel for respective ones of the terminal devices, and wherein the radio interface is based on a radio frame structure comprising a plurality of subframes, wherein each subframe comprises a control region for supporting the downlink control channel and a user-plane region for supporting the downlink shared channel, and wherein the method comprises transmitting in the control region of a first radio subframe an indication of a physical resource allocation for a first terminal device on the shared downlink channel in the user-plane region of a second radio subframe, and subsequently transmitting user-plane data on the physical resource allocation for the first terminal device on the shared downlink channel in the user-plane region of the second radio subframe.

In accordance with some embodiments the second radio subframe is transmitted a predefined interval after the first radio subframe.

In accordance with some embodiments the predefined interval is of a duration which corresponds with a predefined number of subframes.

In accordance with some embodiments the second radio subframe is transmitted a selectable interval after the first radio subframe and the physical resource allocation for the first terminal device is transmitted in association with an indication of a selected interval.

In accordance with some embodiments the indication of the selected interval comprises an indication of a number of subframes.

In accordance with some embodiments the control region of the first radio subframe is further used to transmit a physical resource allocation for a second terminal device on the shared downlink channel in the user-plane region of the first radio subframe.

In accordance with some embodiments the first terminal device is a terminal device of a first type and the second terminal device is a terminal device of a second type, the second type being different from the first type.

In accordance with some embodiments the physical resource allocation for the first terminal device is transmitted using a first format for conveying control-plane data and the physical resource allocation for the second terminal device is transmitted using a second format for conveying control-plane data, the second format being different from the first format.

In accordance with some embodiments the physical resource allocation for the first terminal device is transmitted using a first format for conveying control-plane data and the physical resource allocation for the second terminal device is transmitted using a second format for conveying control-plane data, the second format being the same as the first format.

In accordance with some embodiments the first terminal and second terminal devices are of the same type.

In accordance with some embodiments the method further comprises determining an estimate of extent to which available resources in the control region of the first and/or second radio subframe will be used to convey physical resource allocations for terminal devices before transmitting the control region of the first radio subframe, and, based on the estimate, deciding to use the first radio subframe to convey an indication of a physical resource allocation in the second radio subframe.

In accordance with some embodiments the first terminal device is a machine-type communication, MTC, terminal device.

In accordance with some embodiments the telecommunications system is based around a 3rd Generation Partnership Project, 3GPP, architecture.

According to another aspect of the invention there is provided a base station for use in a telecommunications system comprising the base station and a plurality of terminal devices arranged to communicate with the base station over a radio interface supporting a downlink shared channel for conveying user-plane data from the base station to the terminal devices and a downlink control channel for conveying control-plane data from the base station to the terminal devices, wherein the control-plane data conveys information on physical resource allocations for the downlink shared channel for respective ones of the terminal devices, and wherein the radio interface is based on a radio frame structure comprising a plurality of subframes, wherein each subframe comprises a control region for supporting the downlink control channel and a user-plane region for supporting the downlink shared channel, and wherein the base station is configured to transmit in the control region of a first radio subframe an indication of a physical resource allocation for a first terminal device on the shared downlink channel in the user-plane region of a second radio subframe and to subsequently transmit user-plane data on the physical resource allocation for the first terminal device on the shared downlink channel in the user-plane region of the second radio subframe.

According to another aspect of the invention there is provided a method of operating a telecommunications system comprising a base station and a plurality of terminal devices arranged to communicate over a radio interface supporting a downlink shared channel for conveying user-plane data from the base station to the terminal devices and a downlink control channel for conveying control-plane data from the base station to the terminal devices, wherein the control-plane data is arranged to convey information on physical resource allocations for the downlink shared channel for respective ones of the terminal devices, and wherein the radio interface is based on a radio frame structure comprising a plurality of subframes, wherein each subframe comprises a control region for supporting the downlink control channel and a user-plane region for supporting the downlink shared channel, and wherein the method comprises using the control region of a first radio subframe to convey an indication of a physical resource allocation for a first terminal device on the shared downlink channel in the user-plane region of a second radio subframe, the second radio frame being subsequent to the first radio subframe.

According to another aspect of the invention there is provided a telecommunications system comprising a base station and a plurality of terminal devices arranged to communicate over a radio interface supporting a downlink shared channel for conveying user-plane data from the base station to the terminal devices and a downlink control channel for conveying control-plane data from the base station to the terminal devices, wherein the control-plane data is arranged to convey information on physical resource allocations for the downlink shared channel for respective ones of the terminal devices, and wherein the radio interface is based on a radio frame structure comprising a plurality of subframes, wherein each subframe comprises a control region for supporting the downlink control channel and a user-plane region for supporting the downlink shared channel, and wherein the telecommunications system is configured such that the control region of a fast radio subframe is used to convey an indication of a physical resource allocation for a first terminal device on the shared downlink channel in the user-plane region of a second radio subframe, the second radio frame being subsequent to the first radio subframe.

According to another aspect of the invention there is provided a method of operating a terminal device for communicating with a base station in a telecommunications system over a radio interface supporting a downlink shared channel for conveying user-plane data from the base station to the terminal device and a downlink control channel for conveying control-plane data from the base station to the terminal device, wherein the control-plane data conveys information on physical resource allocations for the downlink shared channel for the terminal device, and wherein the radio interface is based on a radio frame structure comprising a plurality of subframes, wherein each subframe comprises a control region for supporting the downlink control channel and a user-plane region for supporting the downlink shared channel, and wherein the method comprises receiving in the control region of a first radio subframe an indication of a physical resource allocation for the terminal device on the shared downlink channel in the user-plane region of a second radio subframe, and subsequently receiving user-plane data on the physical resource allocation for the terminal device on the shared downlink channel in the user-plane region of the second radio subframe.

In accordance with some embodiments the second radio subframe is received a predefined interval after the first radio subframe.

In accordance with some embodiments the predefined interval is of a duration which corresponds with a predefined number of subframes.

In accordance with some embodiments second radio subframe is received a selectable interval after the first radio subframe and the physical resource allocation for the terminal device is received in association with an indication of a selected interval.

In accordance with some embodiments the indication of the selected interval comprises an indication of a number of subframes.

In accordance with some embodiments the control region of the first radio subframe is further used to convey a physical resource allocation for a further terminal device on the shared downlink channel in the user-plane region of the first radio subframe.

In accordance with some embodiments the terminal device is a terminal device of a first type and the further terminal device is a terminal device of a second type, the second type being different from the first type.

In accordance with some embodiments the physical resource allocation for the terminal device is received using a first format for conveying control-plane data and the physical resource allocation for the further terminal device is in a second format for conveying control-plane data, the second format being different from the first format.

In accordance with some embodiments the physical resource allocation for the terminal device is received using a first format for conveying control-plane data and the physical resource allocation for the further terminal device is in a second format for conveying control-plane data, the second format being the same as the first format.

According to another aspect of the invention there is provided a terminal device for communicating with a base station in a telecommunications system over a radio interface supporting a downlink shared channel for conveying user-plane data from the base station to the terminal device and a downlink control channel for conveying control-plane data from the base station to the terminal device, wherein the control-plane data conveys information on physical resource allocations for the downlink shared channel for the terminal device, and wherein the radio interface is based on a radio frame structure comprising a plurality of subframes, wherein each subframe comprises a control region for supporting the downlink control channel and a user-plane region for supporting the downlink shared channel, and wherein the terminal device is configured to receive in the control region of a first radio subframe an indication of a physical resource allocation for the terminal device on the shared downlink channel in the user-plane region of a second radio subframe and to subsequently receive user-plane data on the physical resource allocation for the terminal device on the shared downlink channel in the user-plane region of the second radio subframe.

It will be appreciated that features and aspects of the invention described above in relation to the first and other aspects of the invention are equally applicable and may be combined with embodiments of the invention according to the different aspects of the invention as appropriate, and not just in the specific combinations described above.

BRIEF DESCRIPTION OF DRAWINGS

Embodiments of the present invention will now be described by way of example only with reference to the accompanying drawings where like parts are provided with corresponding reference numerals and in which:

FIG. 9 schematically represents two arbitrary downlink subframes for communicating with terminal devices in accordance with another embodiment of the invention.

DESCRIPTION OF EXAMPLE EMBODIMENTS

Figure 1:
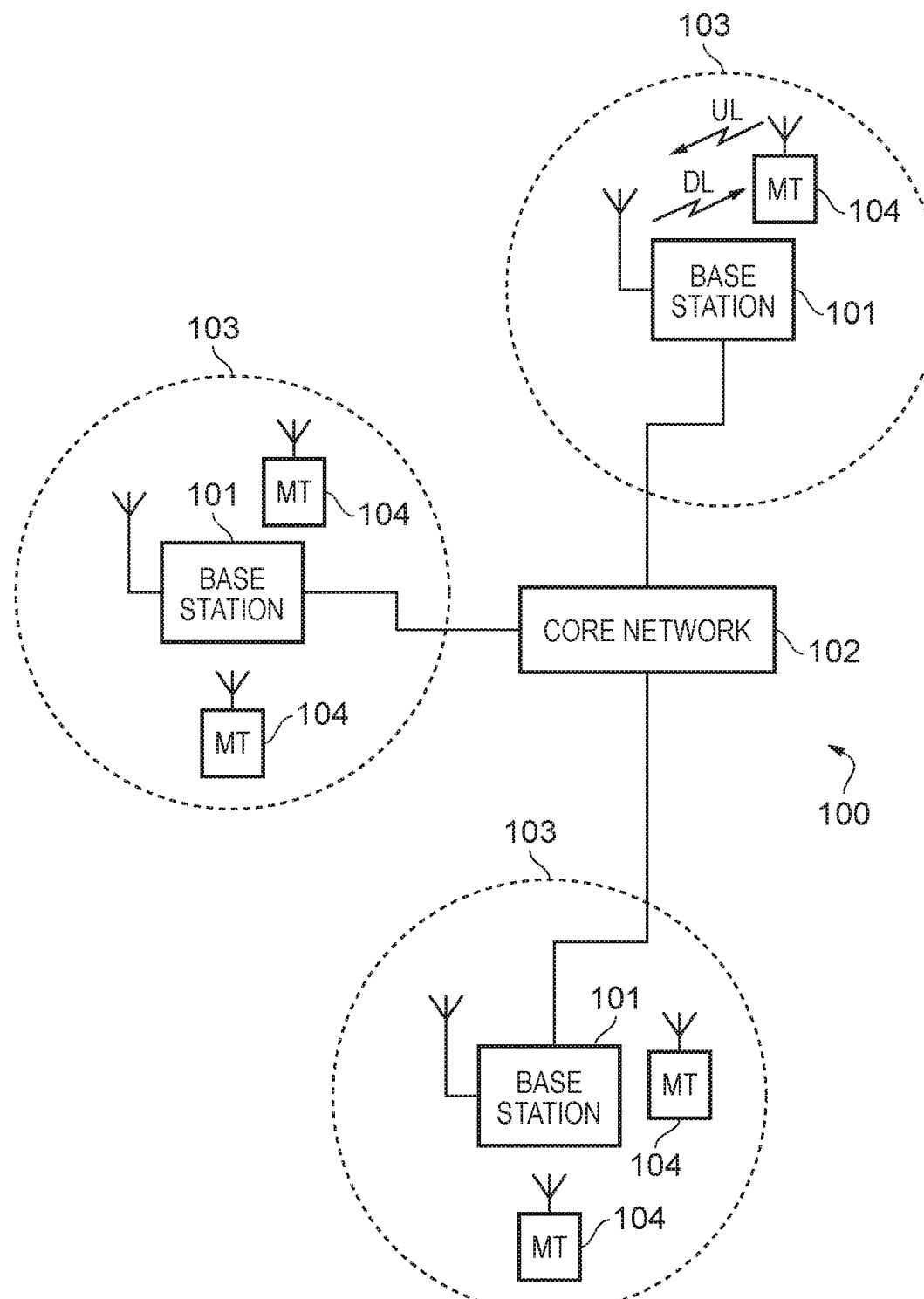
FIG. 1 provides a schematic diagram illustrating an example of a conventional mobile telecommunication system.

FIG. 1 provides a schematic diagram illustrating some basic functionality of a mobile telecommunications network/system 100 operating in accordance with LTE principles and which may be adapted to implement embodiments of the invention as described further below. Various elements of FIG. 1 and their respective modes of operation are well-known and defined in the relevant standards administered by the 3GPP (RTM) body and also described in many books on the subject, for example, Holma H. and Toskala A [13]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-nodeBs, and so forth.

Figure 2:
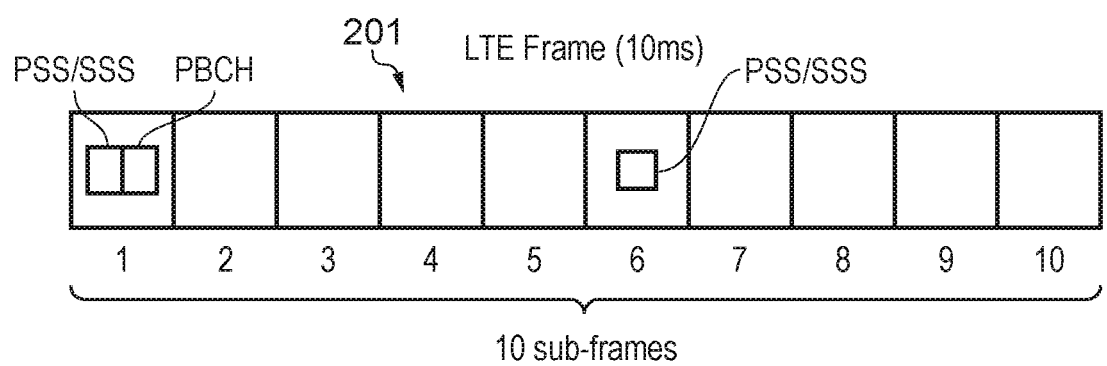
FIG. 2 provides a schematic diagram illustrating a conventional LTE radio frame.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
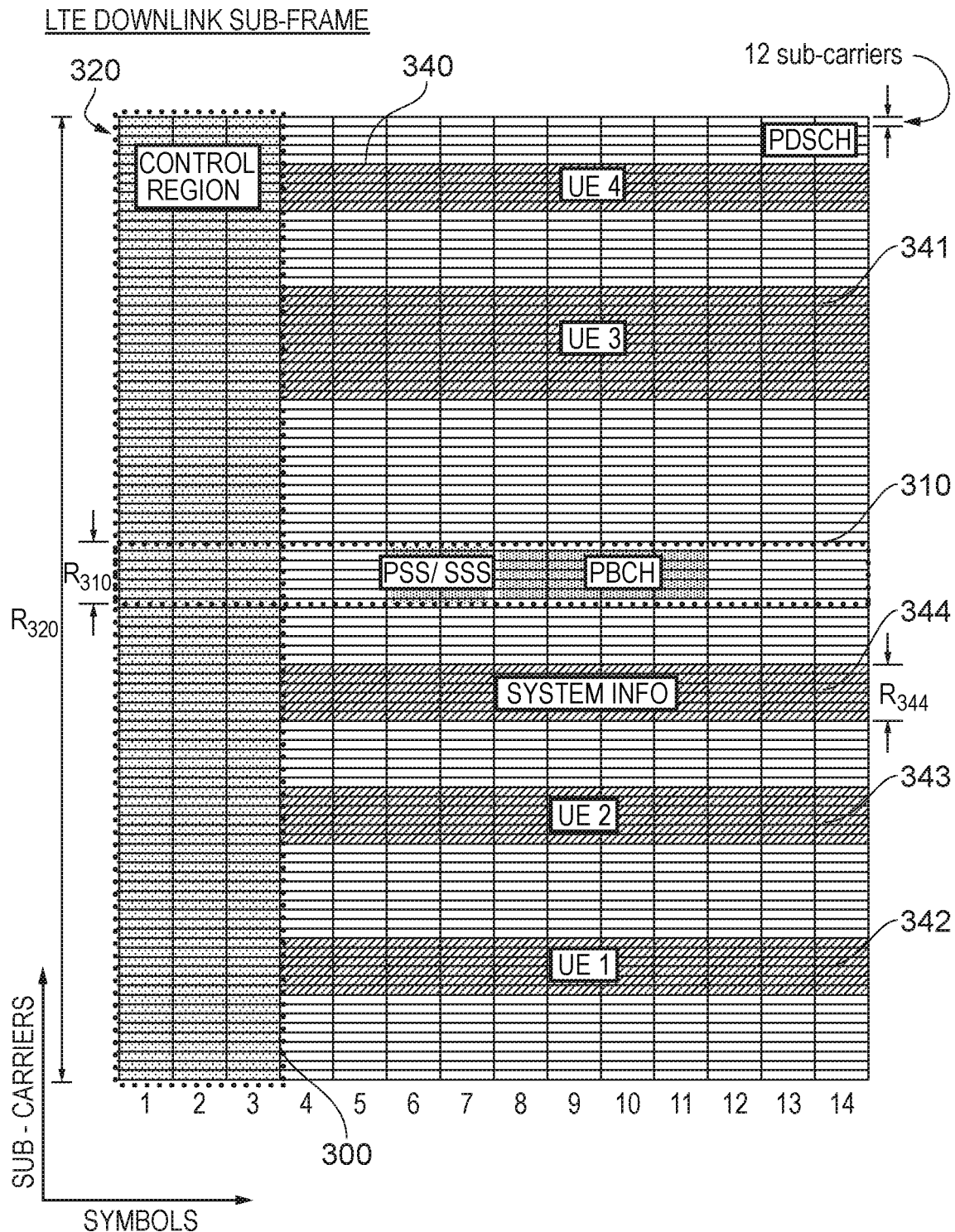
FIG. 3 provides a schematic diagram illustrating an example of a conventional LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth and in this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE terminals 340, 341, 342, 343. For example, the resource allocation 342 for a first LTE terminal (UE 1) extends over five blocks of twelve subcarriers (i.e. 60 subcarriers), the resource allocation 343 for a second LTE terminal (UE2) extends over six blocks of twelve subcarriers (i.e. 72 subcarriers), and so on.

Control channel data is transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information.

PDCCH contains control data indicating which subcarriers of the subframe have been allocated to specific LTE terminals. This may be referred to as physical-layer control signalling/data. Thus, the PDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow an LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

FIG. 3 also shows a region of PDSCH containing system information and extending over a bandwidth of $R_{344}$. A conventional LTE subframe will also include reference signals which are discussed further below but not shown in FIG. 3 in the interests of clarity.

The number of subcarriers in an LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity. Therefore a conventional LTE terminal must be able to receive the entire channel bandwidth in order to receive and decode the control region.

Figure 4:
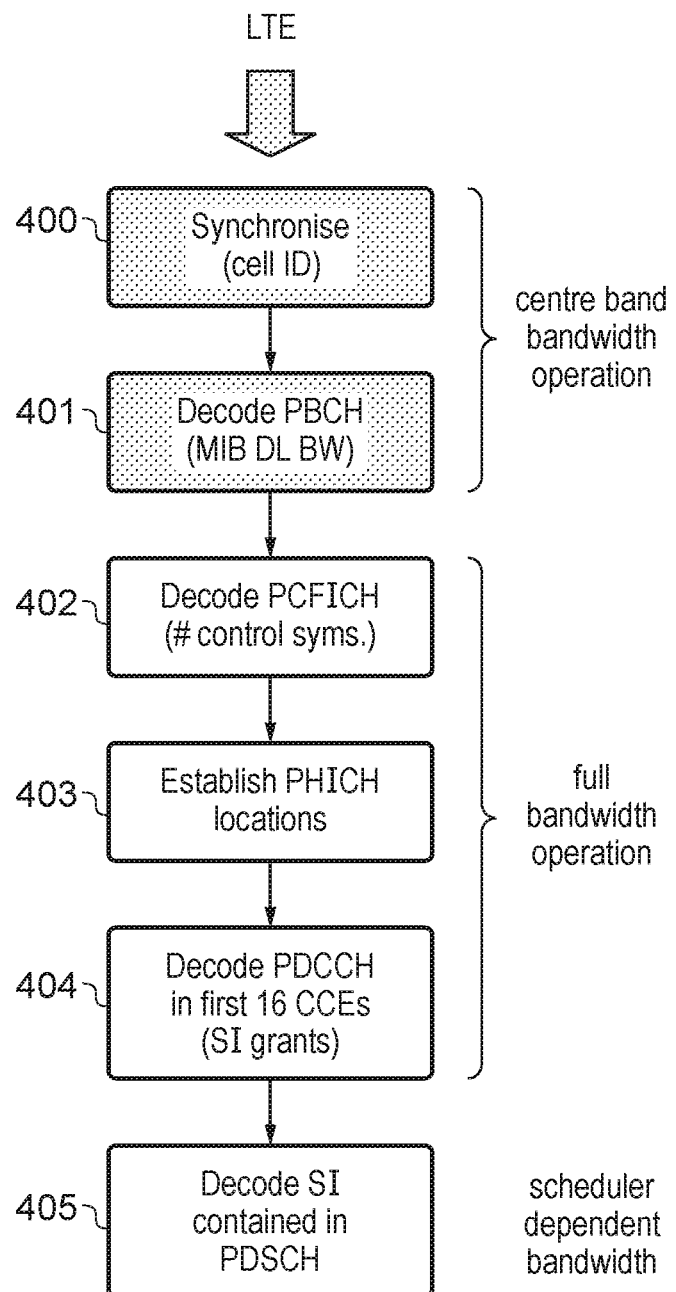
FIG. 4 provides a schematic diagram illustrating a conventional LTE "camp-on" procedure.

FIG. 4 illustrates an LTE "camp-on" process, that is, the process followed by a terminal so that it can decode downlink transmissions which are sent by a base station via a downlink channel. Using this process, the terminal can identify the parts of the transmissions that include system information for the cell and thus decode configuration information for the cell.

As can be seen in FIG. 4, in a conventional LTE camp-on procedure, the terminal first synchronizes with the base station (step 400) using the PSS and SSS in the centre band and then decodes the PBCH (step 401). Once the terminal has performed steps 400 and 401, it is synchronized with the base station.

For each subframe, the terminal then decodes the PCFICH which is distributed across the entire bandwidth of carrier 320 (step 402). As discussed above, an LTE downlink carrier can be up to 20 MHz wide (1200 subcarriers) and a standard LTE-compliant terminal therefore has to have the capability to receive and decode transmissions on a 20 MHz bandwidth in order to decode the PCFICH. Accordingly, at the PCFICH decoding stage, with a 20 MHz carrier band, the terminal operates at a larger bandwidth (bandwidth of $R_{320}$) than during steps 400 and 401 (bandwidth of $R_{310}$) relating to synchronization and PBCH decoding.

The terminal then ascertains the PHICH locations (step 403) and decodes the PDCCH (step 404), in particular for identifying system information transmissions and for identifying its personal allocation grants. The allocation grants are used by the terminal to locate system information and to locate its data in the PDSCH. Both system information and personal allocations are transmitted on PDSCH and scheduled within the carrier band 320. Steps 403 and 404 also require a standard LTE-compliant terminal to operate on the entire bandwidth $R_{320}$ of the carrier band.

At steps 402 to 404, the terminal decodes information contained in the control region 300 of a subframe. As explained above, in LTE, the three control channels mentioned above (PCFICH, PHICH and PDCCH) can be found across the control region 300 of the carrier where the control region extends over the range $R_{320}$ and occupies the first one, two or three OFDM symbols of each subframe as discussed above. In a subframe typically the control channels do not use all the resource elements within the control region 300, but they are scattered across the entire region, such that an LTE terminal has to be able to simultaneously receive the entire control region 300 for decoding each of the three control channels.

The terminal can then decode the PDSCH (Step 405) which contains system information or data transmitted for this terminal.

As explained above, in an LTE subframe the PDSCH generally occupies groups of resource elements which are neither in the control region nor in the resource elements occupied by PSS, SSS or PBCH. The data in the blocks of resource elements 340, 341, 342, 343 allocated to the different mobile communication terminals (UEs) shown in FIG. 3 have a smaller bandwidth than the bandwidth of the entire carrier, although to decode these blocks a terminal first receives the PDCCH spread across the frequency range $R_{320}$ to determine if the PDCCH indicates that a PDSCH resource is allocated to the UE and should be decoded. Once a UE has received the entire subframe, it can then decode the PDSCH in the relevant frequency range (if any) indicated by the PDCCH. So for example, UE 1 discussed above decodes the whole control region 300 to determine its resource allocation and then extracts the relevant data from the corresponding resource block 342.

Figure 5:
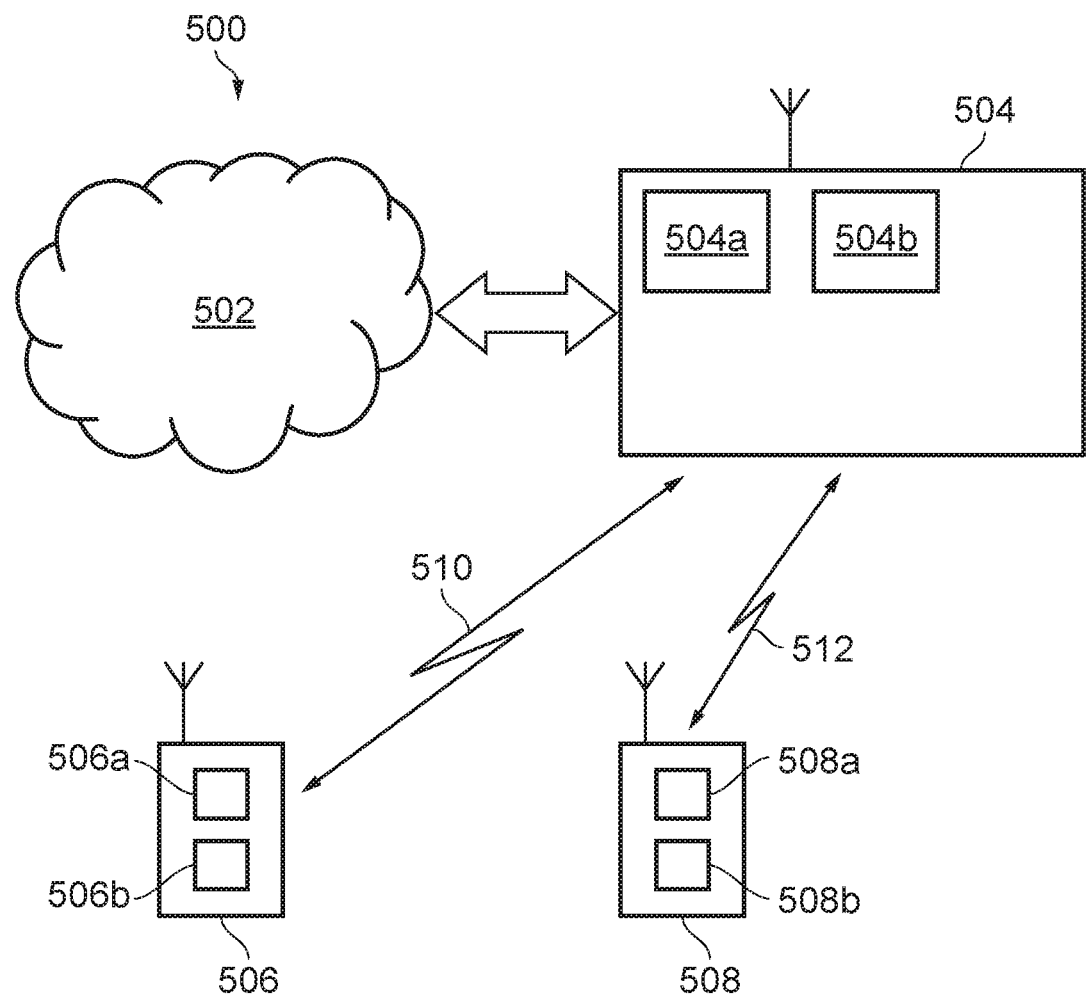
FIG. 5 schematically represents a wireless telecommunications system according to an embodiment of the invention.

FIG. 5 schematically shows a telecommunications system 500 according to an embodiment of the invention. The telecommunications system 500 in this example is based broadly on an LTE-type architecture. As such many aspects of the operation of the telecommunications system 500 are standard and well understood and not described here in detail in the interest of brevity. Operational aspects of the telecommunications system 500 which are not specifically described herein may be implemented in accordance with any known techniques, for example according to the LTE-standards.

The telecommunications system 500 comprises a core network part (evolved packet core) 502 coupled to a radio network part. The radio network part comprises a base station (evolved-nodeB) 504, a first terminal device 508 and a second terminal device 506. It will of course be appreciated that in practice the radio network part may comprise a plurality of base stations serving a larger number of terminal devices across various communication cells. However, only a single base station and two terminal devices are shown in FIG. 5 in the interests of simplicity.

The terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service, EPS, connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 5 may be broadly conventional apart from where modified to provide functionality in accordance with embodiments of the invention as discussed herein.

In this example, it is assumed the second terminal device 506 is a conventional smart-phone type terminal device communicating with the base station 504. Thus, and as is conventional, this second terminal device 506 comprises a transceiver unit 506a for transmission and reception of wireless signals and a controller unit 506b configured to control the smart phone 506. The controller unit 506b may comprise a processor unit which is suitably configured/programmed to provide the desired functionality using conventional programming/configuration techniques for equipment in wireless telecommunications systems. The transceiver unit 506a and the controller unit 506b are schematically shown in FIG. 5 as separate elements. However, it will be appreciated that the functionality of these units can be provided in various different ways, for example using a single suitably programmed integrated circuit. As will be appreciated the smart phone 506 will in general comprise various other elements associated with its operating functionality.

In this example, it is assumed the first terminal device 508 is a machine-type communication (MTC) terminal device according to an embodiment of the invention. As discussed above, these types of device may be typically characterised as semi-autonomous or autonomous wireless communication devices communicating small amounts of data. Examples include so-called smart meters which, for example, may be located in a customer's house and periodically transmit information back to a central MTC server data relating to the customer's consumption of a utility such as gas, water, electricity and so on. MTC devices may in some respects be seen as devices which can be supported by relatively low bandwidth communication channels having relatively low quality of service (QoS), for example in terms of latency. It is assumed here the MTC terminal device 508 in FIG. 5 is such a device. It will, however, the appreciated that embodiments of the invention may also be incremented for other types of terminal device.

As with the smart phone 506, the MTC device 508 comprises a transceiver unit 508a for transmission and reception of wireless signals and a controller unit 508b configured to control the MTC device 508. The controller unit 508b may comprise a processor unit which is suitably configured/programmed to provide the desired functionality described herein using conventional programming/configuration techniques for equipment in wireless telecommunications systems. The transceiver unit 508a and the controller unit 508b are schematically shown in FIG. 5 as separate elements for ease of representation. However, it will be appreciated that the functionality of these units can be provided in various different ways following established practices in the art, for example using a single suitably programmed integrated circuit. It will be appreciated the MTC device 508 will in general comprise various other elements associated with its operating functionality (e.g. a power source, possibly a user interface, and so forth).

The base station 504 comprises a transceiver unit 504a for transmission and reception of wireless signals and a controller unit 504b configured to control the base station 504. The controller unit 504b may comprise a processor unit which is suitably configured/programmed to provide the desired functionality described herein using conventional programming/configuration techniques for equipment in wireless telecommunications systems. The transceiver unit 504a and the controller unit 504b are schematically shown in FIG. 5 as separate elements for ease of representation. However, it will be appreciated that the functionality of these units can be provided in various different ways following established practices in the art, for example using a single suitably programmed integrated circuit. It will be appreciated the base station 504 will in general comprise various other elements associated with its operating functionality. For example, the base station 504 will in general comprise a scheduling entity responsible for scheduling communications. The functionality of the scheduling entity may, for example, be subsumed by the controller unit 504b.

Thus, the base station 504 is configured to communicate data with the smart phone 506 over a first radio communication link 510 and communicate data with the MTC device 508 over a second radio communication link 512. Both radio links may be supported within a single radio frame structure associated with the base station 504.

It is assumed here the base station 504 is configured to communicate with the smart phone 506 over the first radio communication link 510 in accordance with the established principles of LTE-based communications. It will be appreciated the base station may readily obtain information indicating the different classes of terminal device which are attached to the base station in accordance with conventional techniques. That is to say, the base station will be aware that the smart phone is of a device class that includes conventional smartphones and the MTC device is of a device class that includes MTC devices.

Figure 6:
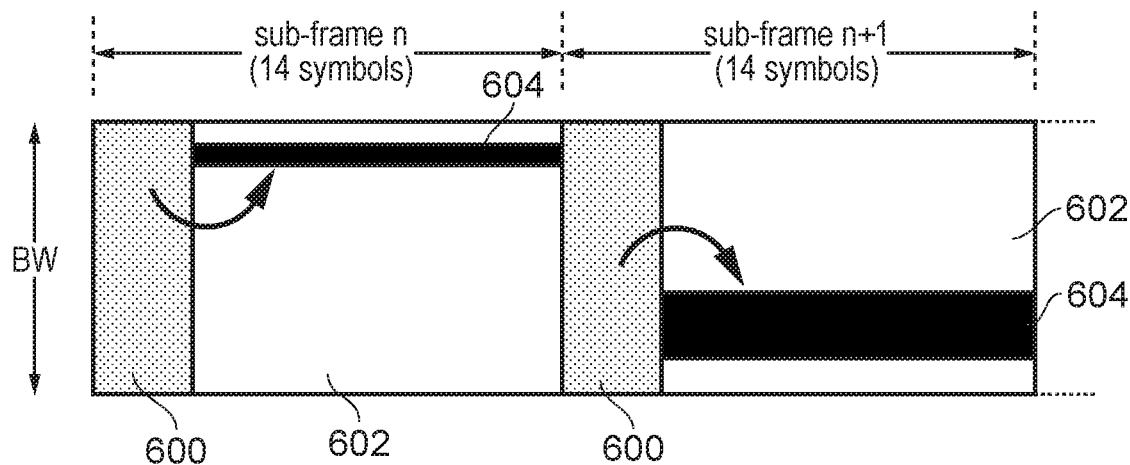
FIG. 6 schematically represents two arbitrary downlink subframes for communicating with a conventional terminal device operating in the wireless telecommunications system of FIG. 5.

FIG. 6 schematically represents two arbitrary downlink subframes (identified as subframe "n" and subframe "n+1") as seen by the smart phone 506 according to the established LTE standards as discussed above. Each subframe is in essence a simplified version of what is represented in FIG. 3. Thus, each subframe comprises a control region 600 supporting the PCFICH, PHICH and PDCCH channels as discussed above and a PDSCH region 602 for communicating higher-layer data (for example user-plane data and non-physical layer control-plane signalling) to respective terminal devices, such as the smart phone 506, as well as system information, again as discussed above. For the sake of giving a concrete example, the frequency bandwidth (BW) of the carrier with which the subframes are associated is taken to be 20 MHz. Also schematically shown in FIG. 6 by black shading are example PDSCH downlink allocations 604 for the smart phone 506. In accordance with the defined standards, and as discussed above, individual terminal devices derive their specific downlink allocations for a subframe from PDCCH transmitted in the control region 600 of the subframe. For the arbitrary example shown in FIG. 6, the smart phone 506 is allocated downlink resources spanning a relatively small fraction of the 20 MHz bandwidth near to the upper end of the carrier frequency in subframe n, and is allocated a larger fraction of the available 20 MHz bandwidth at a lower frequency in subframe "n+1". The specific allocations of PDSCH resources for the smart phone are determined by a scheduler in the network based on the data needs for the device in accordance with standard techniques.

Although the smart phone 506 is typically only allocated a subset of the available PDSCH resources in any given subframe, the smart phone 506 could be allocated these resources anywhere across the full PDSCH bandwidth (BW). Accordingly, the smart phone will in the first instance receive and buffer each entire subframe. The smart phone 506 will then process each subframe to decode PDCCH to determine what resources are allocated on PDSCH, and then process the data received during PDSCH symbols of the subframe and extracts the relevant higher-layer data therefrom.

Thus, referring to FIG. 6, the smart phone 506 represented in FIG. 5 buffers for each subframe the entire control region 600 (shaded dark grey in FIG. 6) and the entire PDSCH region 602 (transmitted in the resources contained in the areas shaded light grey and black in FIG. 6), and extracts the higher-layer data allocated to the smart phone (transmitted in the resources contained in the area shaded black in FIG. 6) from the PDSCH region 602 based on allocation information conveyed in the control region 600.

The inventor has recognised that the requirement for terminal devices to buffer and process each complete subframe to identify and extract what will typically be only a small fraction of the total PDSCH resources contained in the subframe for the terminal device introduces a significant processing overhead. Accordingly, the inventor has conceived of approaches in accordance with which example embodiments of the invention may allow for a terminal device, for example an MTC device, to operate generally in accordance with the principles of existing networks, but without needing to buffer and process an entire subframe to identify and extract its own higher-layer data from that subframe.

This can be achieved in accordance with some embodiments of the invention by delaying the timing of certain resource allocations relative to the timing of the transmission of control data pertaining for the resource allocations as compared with conventional techniques. This approach may conveniently be referred to as a "delayed grant" or "delayed allocation" approach. As described above, in accordance with conventional techniques the control region of a given subframe is used for allocating resources within that subframe. For example, in an LTE system, PDCCH in subframe "n" is used for allocating resources on PDSCH in subframe "n". However, in accordance with embodiments of the invention an alternative approach is conceived of in which the control region of a given subframe is used for allocating resources within a different and subsequent subframe. For example, in the general context of an LTE-type system, PDCCH is subframe "n" may be used for certain types of terminal device for allocating resources on PDSCH in subframe "n+X", where X is a non-zero positive integer. This delayed-allocation approach can allow a terminal device to receive and process control data to identify its resource allocations before the allocated resources are transmitted. The terminal device may thus be configured to receive and decode only the relevant parts of the subsequent downlink subframe carrying the allocated resources. That is to say, the terminal device does not need to buffer each subframe to ensure it has access to its allocated resources specified in the allocation information of the control data for the subframe once it has decoded the control data. Instead, the terminal device is able to decode the control data during the delay period to identify which (if any) downlink resource allocations are upcoming, and the subsequently receive and process the corresponding portions of the relevant downlink subframe accordingly.

Figure 7:
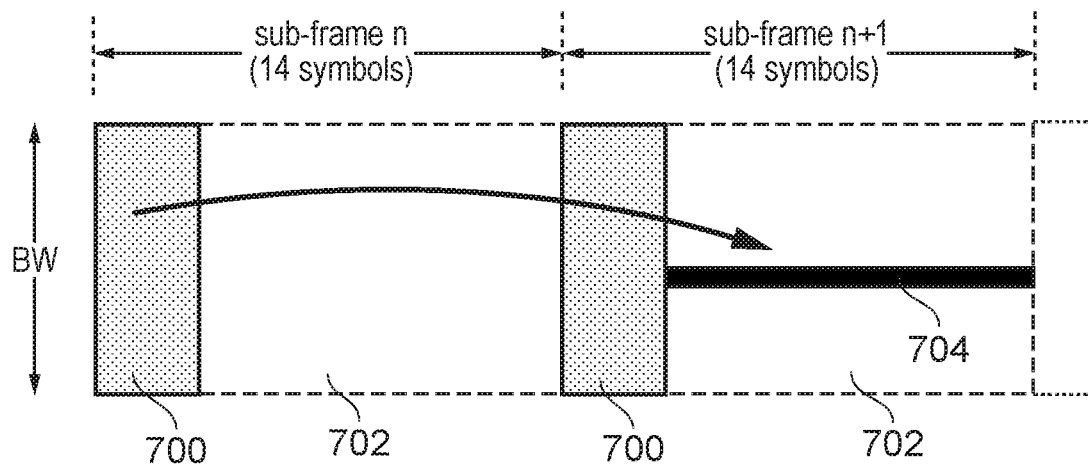
FIG. 7 schematically represents two arbitrary downlink subframes for communicating with a terminal device operating according to an embodiment of the invention in the wireless telecommunications system of FIG. 5.

FIG. 7 schematically represents an approach for communicating data with a terminal device according to an embodiment of the invention. More specifically, FIG. 7 schematically represents two arbitrary downlink subframes (identified as subframe "n" and subframe "n+1") as interpreted by the MTC device 508 according to an embodiment of the invention. FIG. 7 is in some respects similar to FIG. 6, and aspects of FIG. 7 which directly correspond to aspects of FIG. 6 are not described again in detail. In this example it is assumed the elements and general principles of the frame structure employed for communicating with the MTC device 508 are the same as the elements frame structure used for communicating with the conventional smartphone device 506, except where modified as discussed below. That is to say, the frame structure used for communicating with the MTC device 508 comprises a PDCCH, PDSCH, following general LTE principles. Furthermore, and as discussed above in relation to FIG. 5, in this particular example communications with the MTC device 508 and the smart phone device 506 are supported within the same frame transmissions from the base station 504. That is to say, the base station communicates with the conventional smart phone 506 and the MTC device 508 according to an embodiment of the invention using the same frames.

Various elements of each subframe in FIG. 7 are in essence represented as simplified versions of corresponding elements of what is represented in FIG. 3. Thus, each subframe comprises a control region 700 supporting channels corresponding to the PCFICH, PHICH and PDCCH channels as discussed above and a PDSCH region 702 for communicating higher-layer data (for example user-plane data and non-physical layer control-plane signalling) to respective terminal devices, such as the smart phone 506 and MTC device 508, as well as system information, again as discussed above. For the sake of giving a concrete example, the frequency bandwidth (BW) of the carrier with which the subframes are associated is taken to be 20 MHz. Although not shown in FIG. 7 for simplicity, the PDSCH regions 702 may include PDSCH downlink allocations for the smart phone 508 similar to those shown with black shading in FIG. 6. In accordance with the general principles underlying the relevant standards, and as discussed above, individual conventional terminal devices, such as the smart phone 508, operating within wireless telecommunications systems according to embodiments of the invention may derive their specific downlink allocations for a subframe from information transmitted on PDCCH in the control region 700 of the relevant subframe, again as represented in FIG. 6. The control regions 700 represented in FIG. 7 may thus be used in accordance with these established principles to identify resource allocations for conventional terminal devices, such as the smart phone 506, within the same subframe. This aspect of communications with conventional devices supported by the subframes schematically represented in FIG. 7 may be the same as described above, for example with reference to FIG. 6.

However, in accordance with an embodiment of the invention, the control regions 700 of the subframes represented in FIG. 7 also carry delayed resource allocation information for terminal devices operating in accordance with embodiments of the invention. Thus, in the example shown in FIG. 7, the control region 700 in subframe "n" carries resource allocation information for downlink resources 704 allocated to the MTC device 508 in subframe "n+1". The MTC device 508 is configured to receive and decode the control region 700 in subframe "n" in accordance with broadly conventional techniques. The MTC device 508 may then process the control region from subframe "n" to identify its resource allocations (if any during the remaining period of subframe "n". This may be performed according to the same general principles as for conventional devices, the only difference being a difference in the subframe in which the resource allocations are to be transmitted by the base station. That is to say, for a conventional terminal device any resource allocations conveyed in the control region 700 of subframe "n" are associated with resource allocations on PDSCH in subframe "n", whereas for a terminal device operating in accordance with an embodiment of the invention, resource allocations conveyed in the control region 700 of subframe "n" are associated with resource allocations on PDSCH in subframe "n+1". Thus, having decoded the control region 700 of subframe "n" and identified a resource allocation 704 in subframe "n+1" therefrom, the MTC device 508 is already aware before transmission of subframe "n+1" which subcarriers of PDSCH in subframe "n+1" have been allocated to the MTC device 508. The MTC device may thus buffer and process these subcarriers accordingly.

Because a terminal device 508 operating in accordance with an embodiment of the invention is aware which PDSCH resources need to be received and decoded before they are transmitted, there is no need for the device to buffer and process the entire subframe to extract its resource allocations after they have been transmitted. This simplifies the processing and storage requirements of a device operating in accordance with an embodiment of the invention, thereby simplifying the device and helping reduce its cost.

In the example shown in FIG. 7, the terminal devices operating according to an embodiment of the invention is allocated resources on PDSCH in a subframe that is delayed relative to the subframe conveying the indication of the resource allocations one subframe. That is to say, indications of resource allocations on PDSCH in a subframe "n+1" are conveyed using PDCCH in subframe "n". For the sake of convenience in terminology, this may be summarised as the delaying of resource allocations by one subframe. It will be appreciated that in other examples the allocated resources may be delayed by other intervals (other numbers of subframes) relative to the transmission of the information indicating the allocation of the resources. An example of this is schematically represented in FIG. 8.

Figure 8:
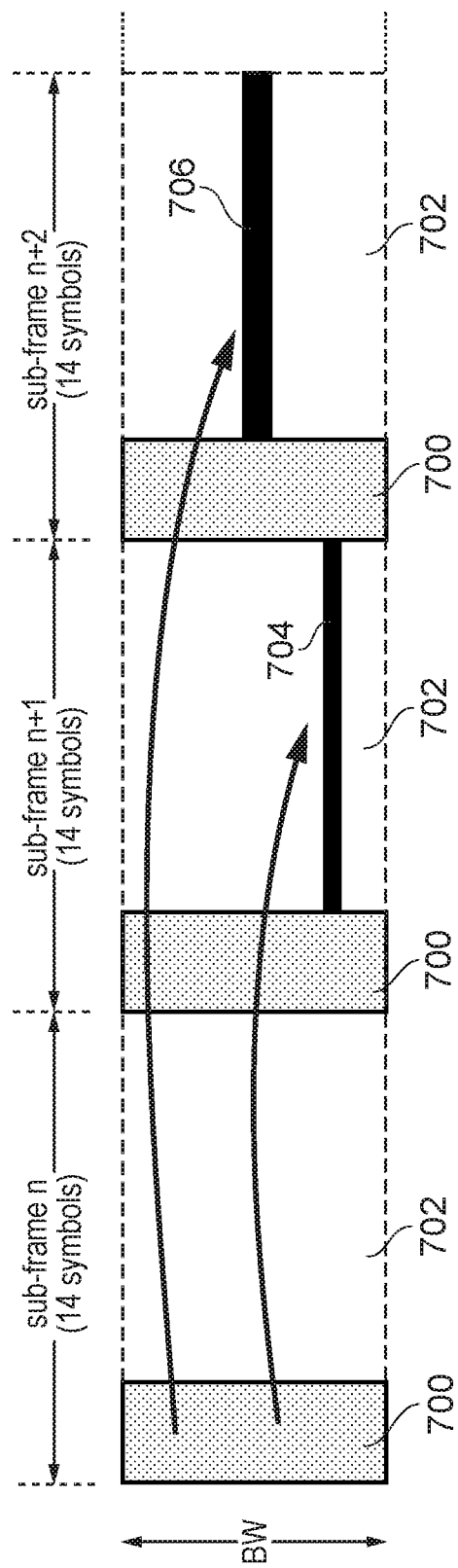
FIG. 8 schematically represents three arbitrary downlink subframes for communicating with terminal devices in accordance with another embodiment of the invention.

FIG. 8 is similar to, and will be understood from FIG. 7. However, FIG. 8 is different from FIG. 7 in that in addition to showing subframes "n" and "n+1" as in FIG. 7, FIG. 8 also schematically represents subframe "n+2".

In the example shown in FIG. 8, the control region 700 of subframe "n" may be used for allocating resources to conventional terminal devices in subframe "n" (not shown for simplicity) and to terminal devices according to embodiments of the invention in subframe "n+1", as discussed above with reference to FIG. 7. However in addition, the control region 700 of subframe "n" in this example also carries an indication of a resource allocation 706 on PDSCH in subframe "n+2" for a terminal device operating according to an embodiment of the invention. Thus, in the example shown in FIG. 8, the control region 700 in subframe "n" carries resource allocation information for downlink resources 704, 706 allocated to terminal devices in subframes "n+1" and "n+2". Whilst this shows an example in which terminal devices according to embodiments of the invention may be allocated physical downlink resources on PDSCH in subframes having different delays relative to the subframe in which the resource allocation information is transmitted on PDCCH, in other examples it may be the case that the same delay is used for all delayable terminal devices. The extent of the delay may be set according to how much time the respective terminal devices need to process the PDCCH to determine their allocations on PDSCH. In general it may be preferable for the delay to be as short as possible while still allowing the terminal devices enough time to properly decode PDCCH to allow them to configure themselves to receive PDSCH on the allocated subcarriers.

In many cases it will be beneficial if the terminal device is aware of the delay that is to be employed by the base station and there are a number of different ways in which information on the delay can be established by/shared between the base station 504 and terminal device 508.

In some cases the delay may be standardised within the wireless communications system. For example, it may be decided that any terminal device and base station which are to operate within the wireless communication system in accordance with an implementation of an embodiment of the invention should assume a delay of one subframe (or other fixed number of subframes). This provides a simple approach, but with limited flexibility. It will be appreciated that the delay to be used may be established by the base station and terminal device in various ways based on predefined standards. For example, rather than explicitly define the delay, a mechanism for deriving the delay may be defined. For example, the standards may specify that all terminal devices which are to operate in accordance with embodiments of the invention (e.g. based on device class) are to derive a delay from an identifier that is known to both the base station and the terminal device. For example, in a simple implementation any terminal devices associated with an odd-numbered IMSI may assume a first delay while any terminal devices associated with an even IMSI may assume a second delay. This provides a simple mechanism for employing multiple delays which can help in sharing the available resources, for example when there is a desire to communicate with a large number of terminal devices using delayed resource allocations in accordance with an embodiment of the invention at around the same time.

However, to improve overall scheduling flexibility it may be preferable in some implementations for the delay to be selected by the base station and conveyed to the terminal device. For a semi-permanent delay (e.g. One that remains fixed for the duration of a given connection), this could be done during a cell-attach procedure. The operating capabilities of the terminal device will typically set some limits on the delay that may be used. For example a given terminal device may be unable to operate using a delay having a duration below some threshold. This may be accounted for by standardisation, for example by limiting the minimum delay that may be used by the base station for that particular terminal device (for example based on the type/class of terminal device), or based on the exchange of capability messages between the base station and terminal device.

However, in cases where the delay may be selected from a range of possible delays, for example by the base station scheduler function based on current traffic conditions, in general it is expected that the most convenient and flexible manner to indicate a selected delay to be used by the base station for transmitting user plane data (or other higher layer data) on PDSCH after having transmitted an indication of the subcarriers (i.e. resource allocations) on PDCCH in a previous subframe will be to transmit an indication of the delay in association with the transmission of the indication of the resources to be allocated. For example, this might be done by adopting a new format for the resource allocation messages on PDCCH which allow for the indication of a delay. For example, the indication of the delay may be an indication of a number of subframes following the current subframe in which the allocated PDSCH resource is to be transmitted.

For example, with reference to FIG. 8, the PDCCH signalling in control region 700 of subframe "n" indicating the allocation of the PDSCH resources 704 in subframe "n+1" may be associated with an indication of one subframe delay. Similarly, the PDCCH signalling in control region 700 of subframe "n" indicating the allocation of the PDSCH resources 706 in subframe "n+2" may be associated with an indication of two subframes delay. In the context of LTE, an indication of the delay may be provided by adopting a modified downlink control information (DCI) format. Thus, delayed-grant resource allocations such as described above may be associated with a modified DCI format as compared to conventional resource allocations in which the resources are allocated in the same subframe as the PDCCH indication of the resources.

This provides a base station scheduler with enhanced flexibility in communicating data with terminal devices following a delayed grant approach in accordance with embodiments of the invention. This is because the base station is free to schedule downlink transmissions on PDCCH in multiple subsequent subframes, thereby allowing the base station to better accommodate changes in traffic. Furthermore, a base station may be configured to recognise that different types of terminal device have different capabilities (e.g. based on a defined class type shared during a camp on procedure or defined in a register of the network for the terminal device) and to allocate different delays accordingly. For example particularly low capability devices may be provided with greater delays to give them more time to decode PDCCH before transmission of any corresponding user plane data that has been allocated on PDSCH.

In some examples the terminal device may not be aware in advance of a delay that is to be used by the base station between transmitting resource allocation information on PDCCH and transmitting the associated user-plane data on PDSCH. For example, in some implementations the base station may be configured to allocate delayed resources for a terminal device according to an embodiment of the invention by providing an indication of the relevant subcarriers on PDCCH in subframe "n" as discussed above. The base station may then transmit user plane data on the allocated subcarriers in a subsequent subframe "n+X" having an arbitrary delay (i.e. a delay "X" that is selected by the base station and not known to the terminal device). In such a system, a terminal device operating in accordance with an embodiment of the invention may decode PDCCH in subframe "n" and identify the allocated subcarriers as discussed above go to sleep. Because the terminal device in this example will not know the subframe in which the actual resources will be transmitted (i.e. the terminal device does not know "X"), the terminal device may simply proceed to attempt to decode the relevant subcarriers identified in the resource allocation on PDCCH in subframe "n" on the next and every subsequent subframe until the terminal devices able to successfully decode the relevant resources on PDSCH.

It will be appreciated that whilst the above embodiments have focused primarily on delaying PDSCH transmissions for certain types of terminal device relative to other types of terminal device, the concept of delayed grant allocations may be applied more generally. For example, even when communicating with a terminal device having the ability to buffer and decode an entire subframe in a conventional manner such that it is possible to allocate PDSCH resources in the same subframe as the PDCCH resources indicating the allocation (as is currently done), it may nonetheless be advantageous in some circumstances to allocate delayed grants. For example, this can help provide a base station scheduler with a greater degree of flexibility for sharing the available PDCCH resources for allocating PDSCH resources in different subframes.

For example, it is in principle possible that there will not be sufficient PDCCH resources to allocate all of the available PDSCH resources in any given subframe. This might be the case, for example, where there are lots of terminal devices allocated small amounts of resources on PDSCH. In such circumstances it is possible there are not be enough resources available on PDCCH to individually allocate all the available PDSCH resources to the large number of terminal devices in a single subframe. This can be the case even if there are there are sufficient PDSCH resources to carry the data to be communicated. In a conventional LTE system this issue can therefore potentially lead to a waste of resources in that available PDSCH resources cannot be allocated because of a lack of PDCCH resources. However, in accordance with embodiments of the invention, a base station scheduling function which is aware of an upcoming subframe in which there are insufficient PDCCH resources to allocate all of the available PDSCH resources for the subframe may allocate those PDSCH resources on PDCCH in an earlier subframe. The implementation principles for doing this follow those described above for the case of delaying grant for a reduced-capability terminal device, a difference being the reason behind the decision to allocate downlink resources for a terminal device in a subframe which is later than the subframe carrying the indication of the allocation of downlink resources. In the examples described above for reduced-capability terminal devices the delayed grant is to provide the terminal devices with sufficient time to decode the resource allocation information before needing to receive and decode the allocated (granted) resources. However, in accordance with other embodiments of the invention, the delayed grant may be to allow the base station scheduling function to use available PDCCH resources to allocate PDSCH resources in other subframes for which there would otherwise be insufficient PDCCH resources.

This principle is schematically represented in FIG. 9. FIG. 9 is in general similar to, and will be understood, from FIGS. 6, 7 and 8. Thus, each subframe comprises a control region 900 and a PDSCH region 902. For FIG. 9 it is assumed that PDSCH in subframe "n+1" is to be used for conveying user plane data to a large number of separate terminal devices (which might readily happen when communicating with the MTC-type devices requiring only small amounts of information at any time, for example). The conventional aspects of the base station scheduling function may be responsible for managing the resource allocations which results in this situation. Because of the large number of individual terminal devices to be allocated resources in subframe "n+1", the corresponding control region 900 in subframe "n+1" is heavily utilised, and may indeed become full before it has been possible to allocate all the available PDSCH resources in subframe "n+1". In accordance with an embodiment of the invention, the base station scheduler is configured to identify this situation has arisen (the base station can readily identify this because the base station is ultimately responsible for the scheduling) and to determine whether it is possible to advance-allocate PDSCH resources in subframe "n+1" using control signalling on PDCCH in subframe "n", thereby avoiding wastage of PDSCH resources in subframe "n+1" which might otherwise not be allocatable. If the base station determines it is possible to advance-allocate PDSCH resources in subframe "n+1" using control signalling on PDCCH in subframe "n" (e.g. because there is a terminal device to be scheduled on PDSCH in subframe "n+1" which supports delayed grant as described above and there are available resources on PDSCH in subframe "n" to convey the resource allocation information), the base station may be configured to allocate resources to one or more terminal devices on PDSCH in subframe "n+1" using control signalling on PDCCH in subframe "n" following the principles of the above-described techniques. This is represented in FIG. 9 by heavy arrows schematically representing PDSCH resource allocations in subframe "n+1" being conveyed in the respective control regions 900 of subframes "n" and "n+1". The control region 900 subframe "n" is schematically shown with lighter shading than the control region 900 of subframe "n+1" to indicate the reduced utilisation of the available PDCCH resources in this subframe.

Thus, in accordance with various embodiments of the invention a telecommunications system may be configured to support a system of resource allocations in which information conveying an indication of a resource allocation in one subframe is transmitted in another subframe. In some situations this might be performed to give certain types of terminal device more time to decode the resource allocation information before needing to decode the resource allocation itself. In other situations this might be performed to allow the base station to employ underutilised allocation resources in one subframe to allocate resources in another subframe. These two types of situation might be conveniently referred to as "delayed grant" or "advanced allocation".

It will be appreciated that the above-described functionality may be implemented with appropriate configuration of the relevant elements of the telecommunication system elements (e.g. the base station and terminal devices) in accordance with conventional techniques for providing such types of functionality. Typically this will be through appropriate programming of the relevant elements. For example, the scheduling of downlink resource allocations on PDSCH for the various terminal devices operating within the telecommunication system and the timing of the associated signalling on PDCCH for providing operation in accordance with an embodiment of the invention may be governed by appropriate modification of a base station scheduler otherwise operating in accordance with conventional techniques.

Although embodiments of the invention have been described primarily with reference to an LTE mobile radio network, it will be appreciated that the present invention can be applied to other forms of network such as GSM, 3G/UMTS, CDMA2000, etc.

Thus, there has been described a method of operating a telecommunications system comprising a base station and a plurality of terminal devices arranged to communicate over a radio interface supporting a downlink shared channel for conveying user-plane data from the base station to the terminal devices and a downlink control channel for conveying control-plane data from the base station to the terminal devices, wherein the control-plane data is arranged to convey information on physical resource allocations for the downlink shared channel for respective ones of the terminal devices, and wherein the radio interface is based on a radio frame structure comprising a plurality of subframes, wherein each subframe comprises a control region for supporting the downlink control channel and a user-plane region for supporting the downlink shared channel, and wherein the method comprises using the control region of a first radio subframe to convey an indication of a physical resource allocation for a first terminal device on the shared downlink channel in the user-plane region of a second radio subframe, the second radio frame being subsequent to the first radio subframe.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] ETSI TS 122 368 V10.530 (2011-07)/3GPP TS 22.368 version 10.5.0 Release 10)
[2] UK patent application GB 1101970.0
[3] UK patent application GB 1101981.7
[4] UK patent application GB 1101966.8

[5] UK patent application GB 1101983.3
[6] UK patent application GB 1101853.8
[7] UK patent application GB 1101982.5
[8] UK patent application GB 1101980.9
[9] UK patent application GB 1101972.6
[10] UK patent application GB 1121767.6
[11] UK patent application GB 1121766.8
[12] R1-113113, Pantech USA, 3GPP TSG-RAN WG1 #6bis meeting, Zhuhai, China, 10 Oct. 2011 to 14 Oct. 2011
[13] Holma H. and Toskala A. "*LTE for UMTS OFDMA and SC-FDMA based radio access*", John Wiley and Sons, 2009

The invention claimed is:

1. A terminal device for communicating with a telecommunications system over a radio interface supporting a downlink shared channel for conveying user-plane data to the terminal device and a downlink control channel for conveying control-plane data to the terminal device, wherein the control-plane data conveys information on physical resource allocations for the downlink shared channel for the terminal device, and wherein the radio interface is based on a radio frame structure comprising a plurality of subframes, wherein each subframe comprises a control region for supporting the downlink control channel and a user-plane region for supporting the downlink shared channel, the terminal device comprising:
    circuitry configured to
        transmit an indication of a class type of the terminal device when performing a camp on procedure to establish a link with the telecommunications system;
        receive in the control region of a first radio subframe an indication of a physical resource allocation for the terminal device on the shared downlink channel in the user-plane region of a second radio subframe; and
        receive user-plane data on the physical resource allocation for the terminal device on the shared downlink channel in the user-plane region of the second radio subframe, wherein
    the second radio subframe is transmitted with a delay after transmitting the first radio subframe,
    the delay is dependent on the class type of the terminal device,
    the class type includes at least a mobile-type and a machine-type, the machine type being semi-autonomous or autonomous wireless terminal devices having the reduced bandwidth capabilities as compared to the mobile-type, and
    the delay is increased when the class type is the machine-type.

2. The terminal device of claim 1, wherein the delay is of a duration which corresponds with a predefined number of subframes.

3. The terminal device of claim 1, wherein the circuitry is configured to receive an indication of the delay in association with the physical resource allocation for the terminal device.

4. The terminal device of claim 3, wherein the indication of the delay comprises an indication of a number of subframes.

5. The terminal device of claim 1, wherein the control region of the first radio subframe comprises a physical resource allocation for a further terminal device on the shared downlink channel in the user-plane region of the first radio subframe.

6. The terminal device of claim 5, wherein the terminal device is a terminal device of a first type and the further terminal device is a terminal device of a second type, the second type being different from the first type.

7. The terminal device of claim 6, wherein the physical resource allocation for the terminal device is received using a first format for conveying control-plane data and the physical resource allocation for the further terminal device is in a second format for conveying control-plane data, the second format being different from the first format.

8. The terminal device of claim 6, wherein the physical resource allocation for the terminal device is received using a first format for conveying control-plane data and the physical resource allocation for the further terminal device is in a second format for conveying control-plane data, the second format being the same as the first format.

9. The terminal device of claim 5, wherein the terminal device and further terminal device are of the same type.

10. A base station for use in a telecommunications system comprising the base station and a plurality of terminal devices arranged to communicate with the base station over a radio interface supporting a downlink shared channel for conveying user-plane data from the base station to the terminal devices and a downlink control channel for conveying control-plane data from the base station to the terminal devices, wherein the control-plane data conveys information on physical resource allocations for the downlink shared channel for respective ones of the terminal devices, and wherein the radio interface is based on a radio frame structure comprising a plurality of subframes, wherein each subframe comprises a control region for supporting the downlink control channel and a user-plane region for supporting the downlink shared channel, the base station comprising:
    circuitry configured to
        receive, from a first terminal device performing a camp on procedure to establish a link with the telecommunications system, an indication of a class type of the first terminal device;
        transmit in the control region of a first radio subframe an indication of a physical resource allocation for the first terminal device on the shared downlink channel in the user-plane region of a second radio subframe; and
        transmit user-plane data on the physical resource allocation for the first terminal device on the shared downlink channel in the user-plane region of the second radio subframe, wherein
    the second radio subframe is transmitted with a delay after transmitting the first radio subframe,
    the delay is dependent on the class type of the first terminal device,
    the class type includes at least a mobile-type and a machine-type, the machine type being semi-autonomous or autonomous wireless terminal devices having the reduced bandwidth capabilities as compared to the mobile-type, and
    the delay is increased when the class type is the machine-type.

11. The base station of claim 10, wherein the circuitry is configured such that the delay is of a duration which corresponds with a predefined number of subframes.

12. The base station of claim 10, wherein the circuitry is configured to transmit the physical resource allocation for the first terminal device in association with an indication of a selected interval.

13. The base station of claim 10, wherein the circuitry is configured such that the indication of the delay comprises an indication of a number of subframes.

14. The base station of claim 10, wherein the circuitry is configured to transmit a physical resource allocation for a second terminal device on the shared downlink channel in the user-plane region of the first radio subframe using the control region of the first radio subframe.

15. The base station of claim 14, wherein the first terminal device is a terminal device of a first type and the second terminal device is a terminal device of a second type, the second type being different from the first type.

16. The base station of claim 15, wherein the circuitry is configured to transmit the physical resource allocation for the first terminal device using a first format for conveying control-plane data and to transmit the physical resource allocation for the second terminal device using a second format for conveying control-plane data, the second format being different from the first format.

17. The base station of claim 15, wherein the circuitry is configured to transmit the physical resource allocation for the first terminal device using a first format for conveying control-plane data and to transmit the physical resource allocation for the second terminal device using a second format for conveying control-plane data, the second format being the same as the first format.

18. The base station of claim 14, wherein the first terminal and second terminal devices are of the same type.

* * * * *